United States Patent [19]

Councilman

[11] Patent Number: 4,488,689
[45] Date of Patent: Dec. 18, 1984

[54] METHOD OF ASSEMBLING A DRAG CARTRIDGE IN A REAR MOUNTED DRAG REEL

[75] Inventor: Richard R. Councilman, Collinsville, Okla.

[73] Assignee: Brunswick Corporation, Skokie, Ill.

[21] Appl. No.: 406,539

[22] Filed: Aug. 9, 1982

[51] Int. Cl.³ ...................... A01K 89/01; A01K 89/02
[52] U.S. Cl. .................... 242/84.5 A; 29/469
[58] Field of Search ............ 242/84.21 R, 84.5 A, 242/84.5 R, 84.51 A, 84.51 R, 217, 218, 219; 188/71.5, 73.31, 73.32, 73.33, 73.34; 464/44, 45, 46, 47; 29/469

[56] References Cited

U.S. PATENT DOCUMENTS

| | | | |
|---|---|---|---|
| 1,427,025 | 8/1922 | Schlafly | 464/46 |
| 2,288,849 | 7/1942 | Schwitzer | 464/46 |
| 2,334,244 | 11/1943 | Burdick | 242/84.5 R |
| 2,646,939 | 7/1953 | Hirsch | 464/45 |
| 2,760,357 | 8/1956 | Burns | 242/219 |
| 2,863,617 | 12/1958 | Chapin et al. | 242/84.5 A |
| 2,943,466 | 7/1960 | Elliott | 464/47 |
| 3,120,357 | 2/1964 | Wood, Jr. | 242/84.5 A |
| 3,585,817 | 6/1971 | McCafferty | 464/47 |
| 4,193,561 | 3/1980 | Stiner | 242/84.51 A |
| 4,391,419 | 7/1983 | Iwama et al. | 242/84.5 A |

*Primary Examiner*—Billy S. Taylor
*Attorney, Agent, or Firm*—John G. Heimovics

[57] ABSTRACT

An improved drag assembly is provided and comprises replaceable cartridge assemblies which can be precalibrated for a range of drag settings. The reel has a drag knob assembly which supports a selectively replaceable spring and is latched to the reel housing with the spring bearing on the cartridge assembly. A knob is used to turn the drag knob assembly for advancing or retracting the knob assembly to increase or decrease tension on the spring and to increase or decrease the drag setting for controlling tension on the line. Cartridge assemblies and springs are calibrated and rated and paired with a particular rated test line for use in particular types of fishing. A method of changing cartridge assemblies and springs is included.

1 Claim, 16 Drawing Figures

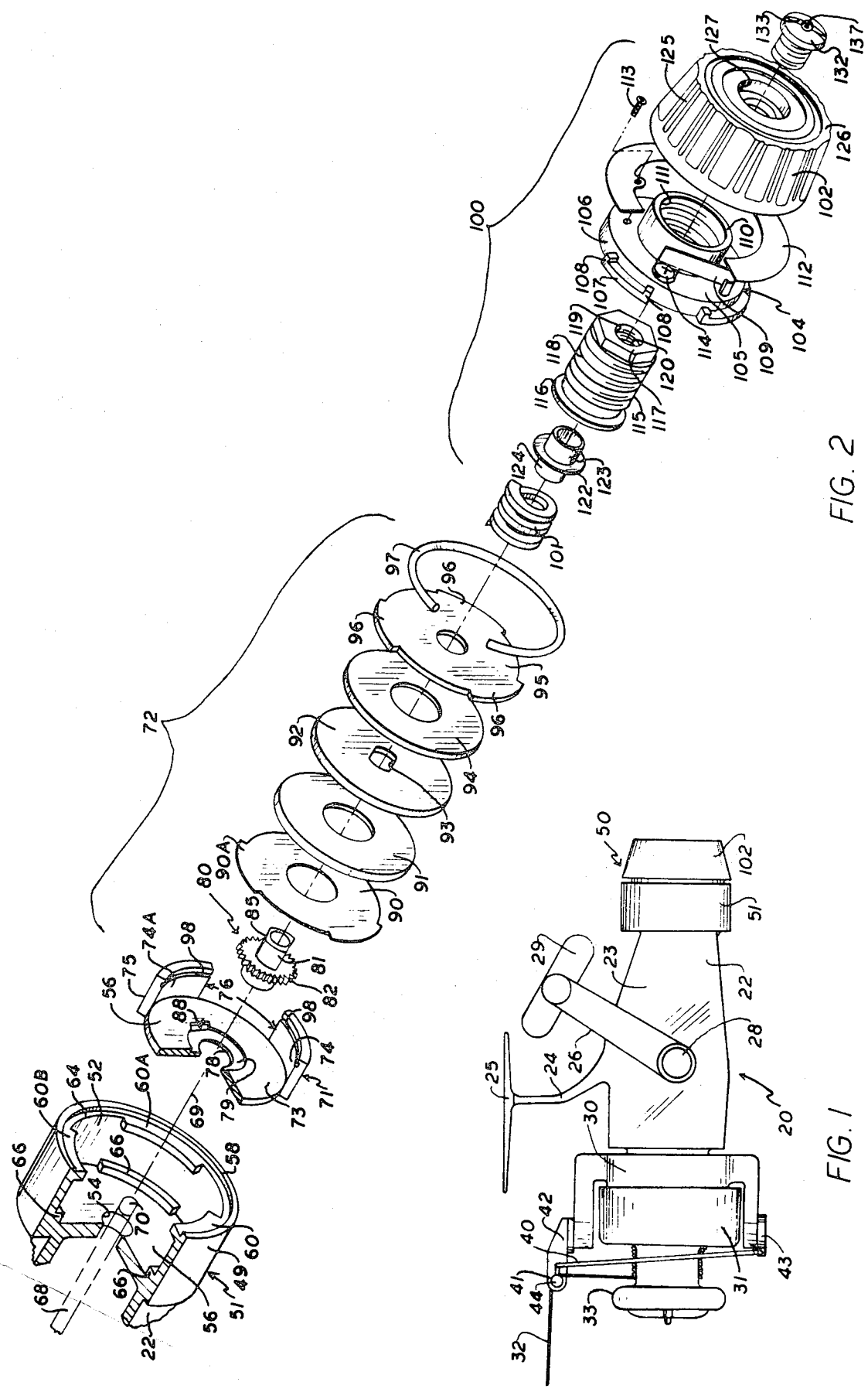

METHOD OF ASSEMBLING A DRAG CARTRIDGE IN A REAR MOUNTED DRAG REEL

BACKGROUND OF THE INVENTION

This invention relates to fishing reels and more particularly to a drag apparatus for a spinning style fishing reel.

BACKGROUND OF THE PRIOR ART

It is well known in the prior art to provide a drag controlled mechanism either in the front of the reel in and/or around the spool or in the rear of the body of the reel. In the case of rear controlled drag systems, many offer convenience of access through a side panel on the reel body but the result is marginally adequate adjustment range, sensitivity and performance. In addition, the present rear controlled drag systems have the full range of drag resistance expected to be encountered by the reel regardless of the line test in use on the rod on the particular occasion must be attained within the rotational limits of adjustment of the control knob.

In some present rear controlled drag systems, changing drag components for maintenance, or to change the friction range of the reel is accomplished by one of the following procedures:

First, for side panel access reels remove the side panel from the body of the reel to gain access to the interior of the body. Remove the drag knob retainer clip, remove the center shaft, and finally remove the drag components. The retainer clip and all of the drag components are loose individual pieces, with the number of pieces of the drag component varying depending upon the design from approximately six to as many as ten pieces. To lose one or more pieces renders the adjustment and for that matter probably the reel, unusable until replacements are found.

Second, for rear access reels remove the drag knob by removing a screw or retainer clip; then remove all loose drag components through an opening at the rear of the reel. The second type of drag controlled system is limited to less than one revolution of the control knob to cover the full range of drag settings.

All in all, the number of parts or pieces to the drag control apparatus that can be lost or can individually fail, the access problem to the pocket for service replacement, and repair of the drag components and the limited size of the drag control apparatus results in less than 100% drag adjustment range and performance.

SUMMARY OF THE INVENTION

This invention addresses the majority of problems, objectionable conditions and limitations in rear controlled drags, while making substantial improvements in function and performance. The invention, in its preferred form, addresses the structural and maintenance limitations of the prior art, while providing greatly extended range and sensitivity of adjustment to meet the range requirements the reel is expected to encounter. The invention may be utilized in either the skirted (out-spool) or non-skirted (in-spool) type.

The improved reel has an enlarged cavity at the rear of the reel body in which one of several cartridge type pre-assembled drag control members is removably received. A drag adjusting knob is rotatably carried by the reel body and urges a spring member against the cartridge to control the drag applied to the center shaft of the reel. Each cartridge contains a drag driver keyed to the center shaft with a drag washer, friction washers and a stationary washer in the cartridge acting when placed under pressure to apply drag to the center shaft. The washers have relatively large diameter drag surfaces which permit lower pressure loading to attain a given frictional resistance. Each cartridge can be preassembled and based upon the rating of an appropriate spring can be calibrated to a specific range of drag settings and can be readily inserted and removed from the cavity in the reel body to provide the appropriate drag for the line rating and type of fishing. The drag cartridge can be quickly changed for changing drag ranges or for replacing worn or malfunctioning drag members. Since larger size friction surfaces require lighter pressure loading to get the desired drag settings, the friction surfaces will have a longer life span and will require less maintenance and replacement. The controlled drag system also uses a spring for transmitting the knob adjustment to the elements of the cartridge so that controlling the spring rate and force will also produce a selectable drag range. The materials used for the friction members in the cartridges and the selection of the spring rate and force provides an excellent drag adjusting system. The removable cartridges can be easily removed and replaced without the need for special tools. The assembled cartridge may be lubricated prior to insertion or at any time after insertion without any disassembly.

BRIEF DESCRIPTION OF THE DRAWINGS

FIG. 1 is a side elevational view of a spinning style fishing reel incorporating the invention therein;

FIG. 2 is an exploded perspective view of the structural parts of the improved drag controlling apparatus of FIG. 1;

GENERAL DESCRIPTION OF A SPINNING STYLE FISHING REEL

Figure 3:
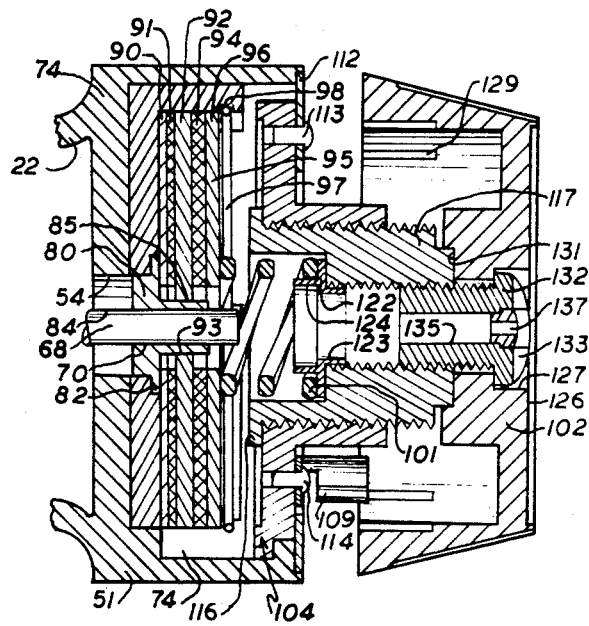
FIG. 3 is a vertical cross sectional view through the rear portion of the reel body and through the improved drag controlling apparatus.

In FIG. 1, a skirted style open-face fishing reel 20 is shown. A conventional style open-face fishing reel is equally useable with the invention. Both styles of reels function similarly, the only exception being the arrangement of the spool. As used hereinafter, the same numerals will designate common parts. The reel 20 has a housing 22 which includes an integral gear case 23, a stem 24 which connects the housing to a shoe 25. The shoe 25 is used to attach the reel to a spinning style fishing rod. The reel includes a crank assembly 26, rotatable about a crankshaft hub 28 with a rotatable winding handle 29 for use by a fisherman with his left hand for line retrieval while the rod (not shown) is being held by the right hand. The handle 29 may be disposed on the other side of the gear case 23 for accommodating the personal desires of the user.

An axially mounted rotor housing 30 is provided and is adapted to rotate about the axis of the spool 31 as the crank 26 is turned for line retrieval, with the line 32 being captured by the bail 40 passing over the line guide assembly 41 as shown. Bail 40 and line guide assembly 41 rotate with rotor 30 so that the line 32 is thereby wound on the spool 31. The bail 40 is pivotable between a retrieve position as shown in FIG. 1, to an open position for casting by means of the bail arms 42,43. An internal mechanism causes the line spool 31 to reciprocate axially back and forth as the rotor 30 winds the line 32 about the spool 31; but as in spinning reels generally, the spool 31 does not rotate about its central core axis, except as controllably permitted by the adjustable drag mechanism 50, as will be described hereinafter. The drag mechanism 50 is mounted in a drag housing 51 on the rear portion of the reel housing 22. Such permitted rotation of the spool may occur during line retrieval when a fish is on the other end of the line 32 resisting capture while still in the water; and thus the force of the drag friction is overcome by tension in the line. When the bail 40 is swung to an open position for casting, the line 32 may freely pay out from the spool 31 over lip 33. In FIG. 1 the bail 40 is shown in the "closed", "retrieve" or "rewind" position. The line guide roller 44 on the line guide assembly 41 is preferably rotatable; that is, it is preferably a miniature pulley to reduce the sliding friction which might otherwise cause line wear.

In paying out the line 32 over the lip 33 of the forward flange of the line spool 31 during casting, the fisherman using an open face spinning reel is obligated to use his finger to snub the line and arrest its pay out, since the normal line drag provisions are not operative unless the reel is in the rewind or line retrieval mode of operation.

DESCRIPTION OF THE PREFERRED EMBODIMENT

Referring to FIGS. 2-4 and 6-13, and in particular initially FIGS. 2-4 and 9-11, a drag controlling and adjusting apparatus 50 for an open face style fishing reel is disclosed. The drag controlling apparatus 50 includes the drag housing 51 integrally formed on the rear of the reel housing. The drag housing 51 has a cylindrical wall 49 defining a rearwardly facing cavity 52 with an opening 54 centrally disposed in a common wall 56 between the reel housing 22 and the cavity in the drag housing 51. The open mouth 58 of the cavity has three radially inwardly extending lugs 60, 60a, 60b equally spaced apart and defining slots 62 between each pair of lugs. A recessed ledge 64 is formed axially in from the outer edge of the mouth 58. One, two or three projecting abutment bosses 66 are integrally formed at the junction between the wall 49 and wall 56 in the cavity and are aligned with lugs 60, 60a and 60b. Each abutment 66 protrudes into the cavity and may be integral or may be a separate piece screwed or otherwise attached to the wall of the cavity. A centershaft 68 lying along the axis 69 of the reel has a splined or keyed end portion 70 extending through the opening 54 into the cavity 52.

A drag cartridge assembly 72, shown in FIGS. 2-4 and 6-8, has a cartridge shell 71 which comprises a circular base wall 73 and three equally sized and equally spaced segments 74, 74a, 74b of a cylindrical wall 75 extending transverse to the base wall 73. An aperture 78 with a recessed collar 79 is centrally disposed through wall 73. Although three equally sized and equally spaced segments 74, 74a, 74b are shown, it is to be understood that two or more segments 74 could be used as long as the spacing 76 between adjacent segments is slightly greater than the peripheral length of the lugs 60, 60a, 60b in the drag housing 51 and as long as the number of lugs 60, 60a, 60b matches the number of spacings 76 between segments 74, 74a, 74b. The root of the spacing 76 at the wall 73 between segments 74, 74a and 74b is slightly longer than the peripheral length of the abutment bosses 66. With the cartridge shell 71 seated in the drag housing 51, the abutment bosses 66 on the housing 51 will seat in the spacings 76 between the respective segments 74, 74a and 74b so that the cartridge shell 71 will not rotate relative to the housing 51.

Figure 8:
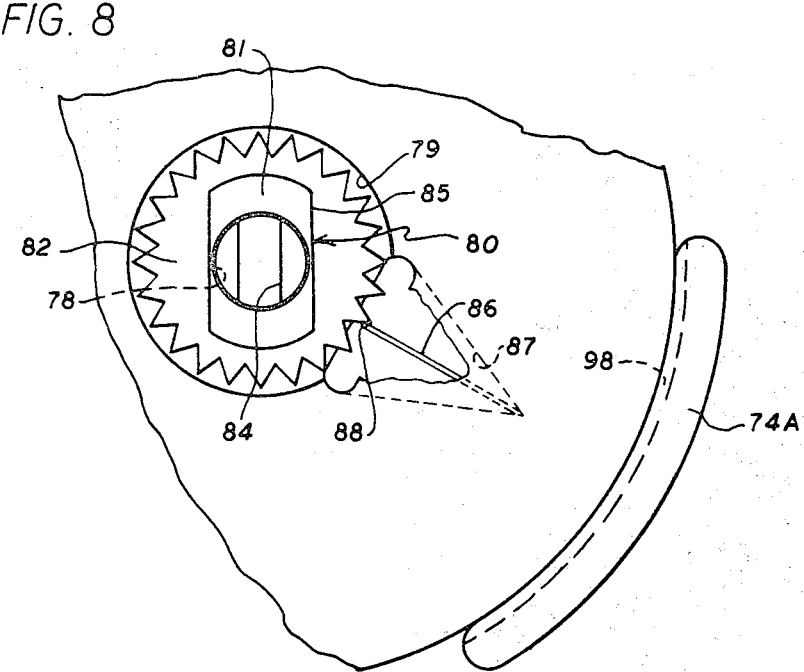
FIG. 8 is a broken away enlarged portion of the cartridge housing of FIG. 6 with a drag driver assembled therewith.
Figure 9:
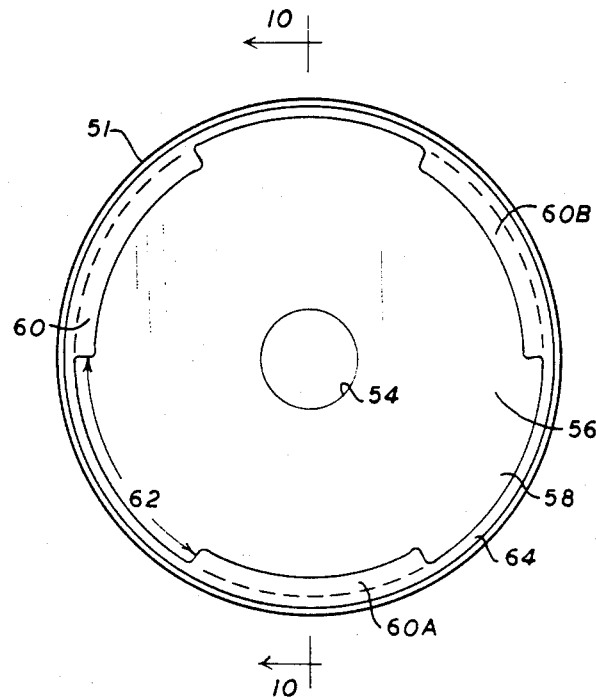
FIG. 9 is a view of the rear of the reel body looking into the drag cavity or pocket.
Figure 10:
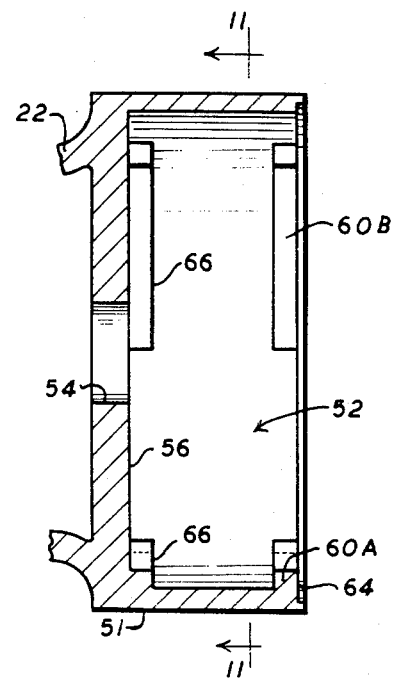
FIG. 10 is a cross sectional view of the rear portion of the reel body taken along the line 10—10 of FIG. 9.
Figure 11:
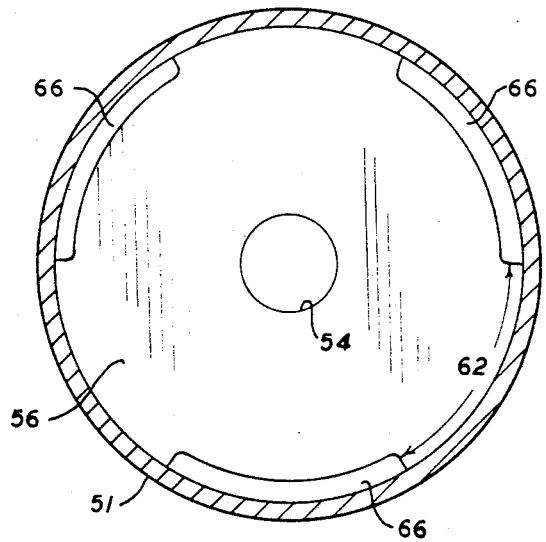
FIG. 11 is a cross sectional view of the rear portion of the reel body taken along the line 11—11 of FIG. 10.
Figure 12:
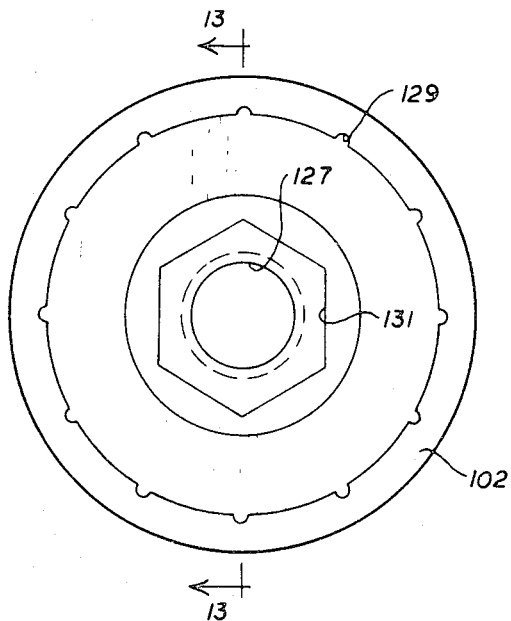
FIG. 12 is an elevational view of the adjusting knob looking into the inside thereof.
Figure 13:
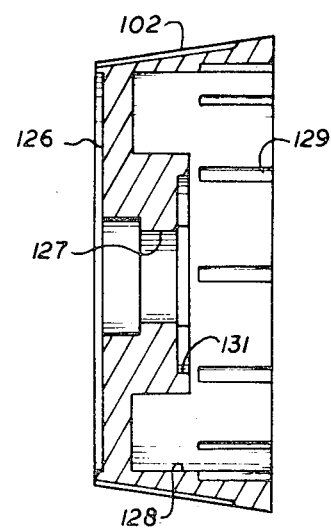
FIG. 13 is a cross sectional view of the knob taken along the line 13—13 of FIG. 12.

The drag cartridge assembly 72 has nested in the shell 71, a drag driver 80 which includes a tubular sleeve 81 attached to a toothed clicker gear 82. The clicker gear 82 is secured to the sleeve 81 in the general midportion of the sleeve. The sleeve 81 has an internal axially splined portion 84 on one end portion and an external axially splined portion 85 on the other end portion thereof (FIGS. 2 and 8). The sleeve 81 of the drag driver 80 is assembled through the aperture 78 in the shell 71. The internal splined portion 84 is adapted to mate with the splined end portion 70 of the centershaft. The clicker gear 82 nests partially in the recessed collar 79 and rotates freely with the sleeve 81 relative to the shell 71. A clicker spring 86 is secured at one end in a triangularly shaped recess 87 in the rear face of the wall 73 with the recess 87 overlapping and communicating with the collar 79 of the aperture 78. A free end 88 of the spring 86 projects into the space between the teeth of the gear 82 so that rotation of the drag driver 80 relative to the shell will create a clicking sound each time the free end 88 of the spring 86 snaps over a tooth on the gear.

Figure 4:
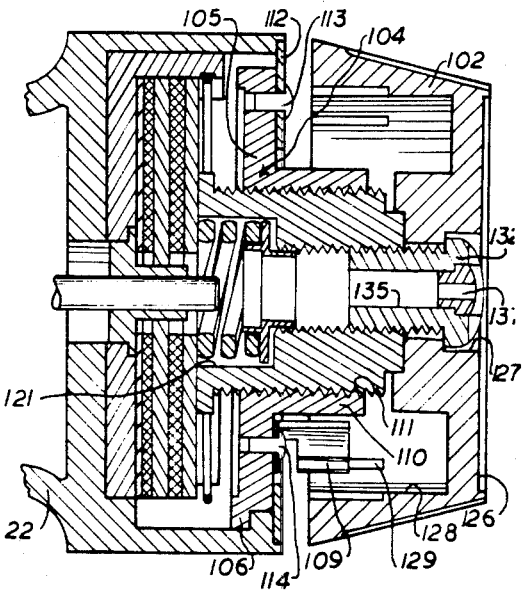
FIG. 4 is a vertical cross sectional view similar to FIG. 3 only with the drag force increased.

Referring particularly to FIGS. 2, 3 and 4, the drag cartridge assembly 72 with the drag driver 80 nested in the shell 71 and with the externally splined portion 85 projecting into the enclosure of the segments 74, 74a and 74b, has a base washer 90 abutting wall 56 with a friction washer 91 between the base washer 90 and a drive washer 92. The base washer 90 overlaps the gear 82 on the drag driver 80 to hold the driver in assembled relation in the collar 79 of the shell. The base washer 90 has outwardly projecting ears 90A which rest in the spacings 76 between the segments 74, 74a and 74b to prevent rotation of the base washer relative to the shell 71. The drive or driven washer 92 is keyed by spline 93 to the splined portion 85 of the drag driver 80 so as to rotate with the drag driver and centershaft 68. A second friction washer 94 bears against the other face of the drive washer 92 and is held in position by a stationary or fixed washer 95 which has radially outwardly projecting lugs 96 nesting in the spacings 76 between the segments 74, 74a, 74b of the shell 71. A lock ring 97 seats in grooves 98 formed in the radial inner surfaces of the segments 74, 74a, 74b to retain the parts of the cartridge assembled in the shell 71.

Each drag cartridge assembly 72 can be provided with a different drag setting range. That is, by providing different friction surfaces on either or both the base washer 90, drive washer 92 and stationary washer 95 and by providing the friction washers 91 and 94 of different friction materials different drag setting ranges can be established.

A drag knob assembly 100 is provided and is assembled with the open mouth 58 of the housing 51 so that a compression spring 101 of the knob assembly bears against the stationary washer 95 of the cartridge 72 as the knob 102 is rotated to increase or decrease the drag on the centershaft 68. More specifically, referring variously to FIGS. 2,3,4,12 and 13, a cover plate 104 is provided and has a body portion 105 with an axially disposed flange 106 about the periphery thereof. Radial locking lugs 107 project outward from the flange 106 and have a peripheral length slightly less than the length of the slots 62 between the lugs 60, 60a, 60b of the housing 51. Detents or locking ribs 108 are formed at the extreme ends of the upper surfaces of the locking lugs 107. The locking lugs 107 are slightly longer than the lugs 60, 60a, 60b so that the detents or locking ribs 108 on each locking lug are spaced apart a distance equal to the outside peripheral length of each lug 60, 60a, 60b. An axially extending sleeve 110 is integrally formed with the body portion 105 and is internally threaded at 111. A seal ring 112 of resilient material is screwed or riveted as at 113 to the outer face of the body portion 105 of the cover plate and projects radially outward from the periphery of the body portion 105 in overlapping relation with the locking lugs 107. A detent spring 109 is anchored by screw or rivet 114 at one end portion to the outer face of the cover plate 104. The detent spring extends along a chord of the plate 104 and has a curved contact end.

A threaded adjusting member 115 has a radial flange 116 at one end and a hexagonal portion 117, or the like, at the opposite end. The member 115 has an external thread 118 substantially throughout its length with an internal thread 119 in a bore 120 in the center of the hexagonal portion. The adjusting member 115 has a blind hollow portion 121 extending axially inward from the flanged end. A centering and retaining member 122 has one sleeved end portion 123 force fit into the bore 120 with an opposite sleeved end portion 124 fitting in the end of the spring 101 to retain the spring assembled with the adjusting member and cover plate 104. The adjusting member 115 is threaded into the threaded sleeve 110 with the hexagonal portion 117 extending axially beyond the end of the sleeve 110.

The drag adjusting knob 102 has a radially and axially outwardly flared and textured gripping wall surface 125 joined by an end wall portion 126 which has a recessed aperture 127 in the midportion thereof. Internally, the wall 125 has a cylindrical portion 128 with axially extending, equally spaced fluting 129. The knob 102 has on the inside of the end wall portion 126 a hexagonal shaped recess 131 surrounding the aperture 127. The recess 131 of the knob is mated with the hexagonal portion 117 on the adjusting member 115 whereupon a retaining screw 132 is passed through aperture 127 and threaded into bore 119 for retaining the knob on the cover plate 104. It is understood that any shaped portion 117 and recess 131 can be used to key the knob to the adjusting member. The detent spring 109 on the cover plate 104 has its curved end engaging the fluting 129 in the knob 102 so as to resist rotation of the knob relative to the cover plate 104 and to produce a dull clicking sound. The retaining screw 132 has a slot 133 diametrically across the top surface thereof with an aperture 135 extending axially through the screw. A lubrication fitting 137 is seated in the aperture 135. A passageway extends from the fitting 137 through the adjusting member 115, retaining member 122 and into the cartridge 72. Lubricant for the drag is applied through the fitting 137 without disassembly of the adjusting apparatus.

The drag knob assembly 100 is assembled with the housing 51 on the reel by first turning the knob until the flange 116 on the member 115 bears against the cover plate 104, then aligning the locking lugs 107 with the spacings 62 between the lugs 60, 60a, 60b on the housing. Moving the knob assembly toward the housing will contact the spring 101 against the stationary plate 95 of the cartridge as the locking lugs 107 move into the spacings 62 and the seal ring 112 abuts the end of the housing. Urging forward on the knob assembly will depress the spring 101 against the stationary plate and deform the seal 112 until the locking lugs 107 clear the lugs 60, 60a, 60b whereupon turning the knob assembly 100 relative to the housing will rotate the locking lugs 107 below the lugs 60, 60a, 60b until the detents 108 on the ends of the locking lugs 107 straddle the lugs 60, 60a, 60b. Releasing the knob assembly 102 will permit the seal ring 112 to latch the locking lugs 107 and the lugs 60, 60a, 60b together so that the knob assembly 102 is now locked to the reel housing ready for use. The seal 112 will also seal out water and debris from the drag system.

Turning the knob 102 will turn the adjusting member 115 which will advance the adjusting member relative to the cover plate 104 to depress the spring 101 against the stationary washer 95 for increasing pressure between the friction washers 91 and 94 and the stationary washer 95, driven washer 92, and base washer 90 for increasing the drag on the drag driver 80 and centershaft 68.

Selection of the material of the friction washers 91,94 for the desired coefficient of friction matched with a spring 101 having a spring rate to meet specific requirements, allows a fisherman to install a selected cartridge assembly 72 combined with a properly rated spring to attain a drag system with the desired range and adjustment sensitivity to meet the requirements of line weight and type of fishing.

Figure 16:
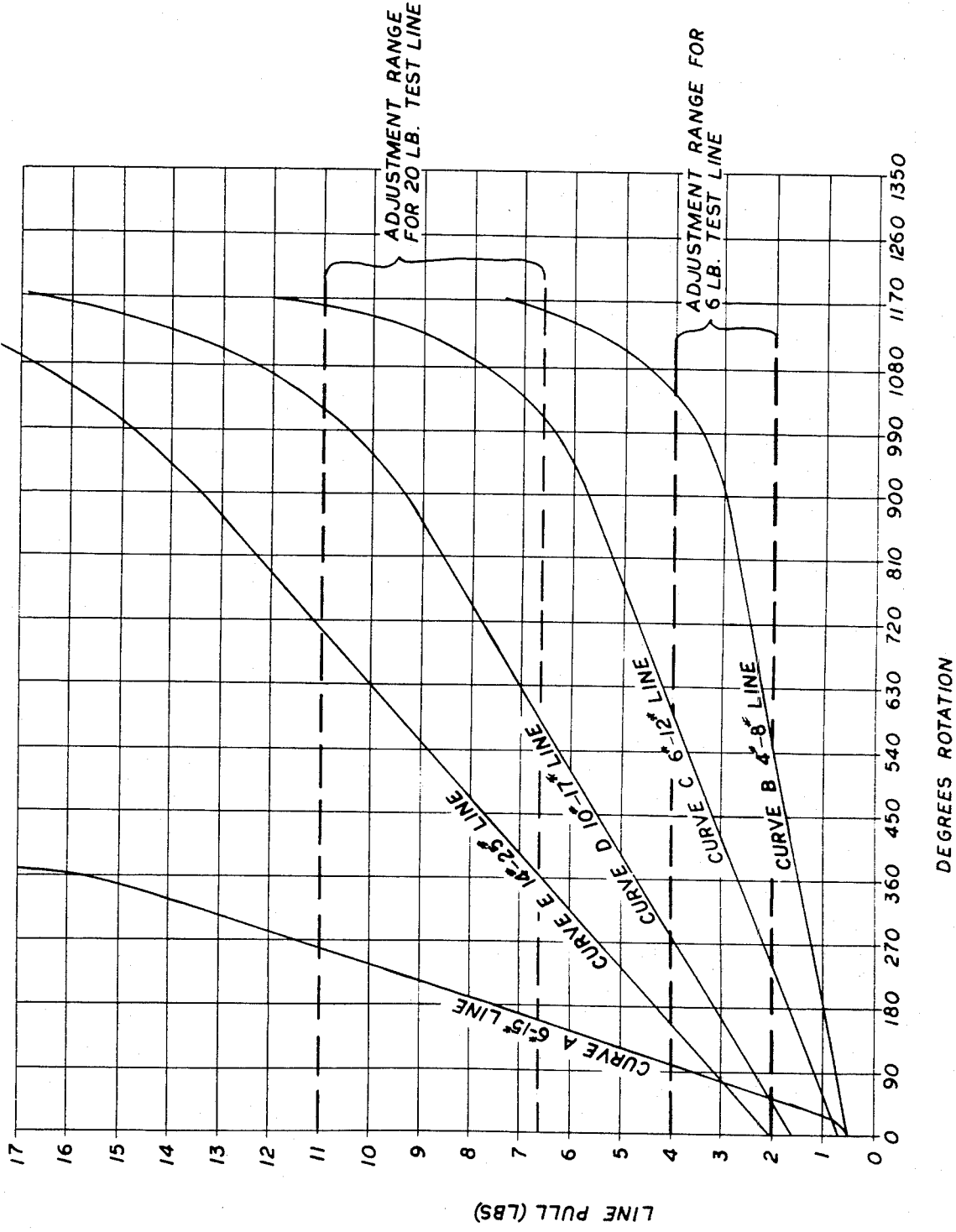
FIG. 16 is a chart of line pull in pounds versus degrees of rotation with curves of the prior art and of different combinations of the improved cartridge system.

The chart shown in FIG. 16 shows some of the effects of possible selection combinations of friction coefficients and spring rate. The chart has line pull (measured line resistance) in pounds versus degrees of rotation of the knob to adjust the drag. The curves on the chart are curves based on different rated lines. Curve A is a prior art rear drag system where one drag assembly must meet the entire range of fishing requirements. Since the normal setting of the drag is from $\frac{1}{3}$ to a maximum of $\frac{2}{3}$ of the rated line strength, the drag adjustment range for a line of six pound class is approximately 65 degrees of rotation of the knob.

Curve B uses the invention wherein the cartridge assembly uses friction washers 91,94 made of a material with a low coefficient of friction and uses a spring 101 with a low load rate selected for use with lines from 4-pound to 8-pound strength. Using a 6-pound line, the usable adjustment is approximately two full turns (720°) of the drag adjustment knob 102.

Curve C uses the same cartridge assembly as curve B but with a higher rated spring 101.

Curve D uses a cartridge assembly with friction washers 91,94 with a higher coefficient of friction and with a low rated spring 101 for use with heavier test line.

Curve E uses even a heavier test line and has a cartridge assembly with a high coefficient of friction and a spring rated with a higher load rating.

A typical low coefficient of friction material would be Teflon. A high coefficient material would be asbestos. A typical low spring rate would be 500 lbs. per inch deflection and a typical high spring rate would be 1000 lbs. per inch deflection. These examples are for illustration only and are not to be considered limiting in nature.

Figure 5:
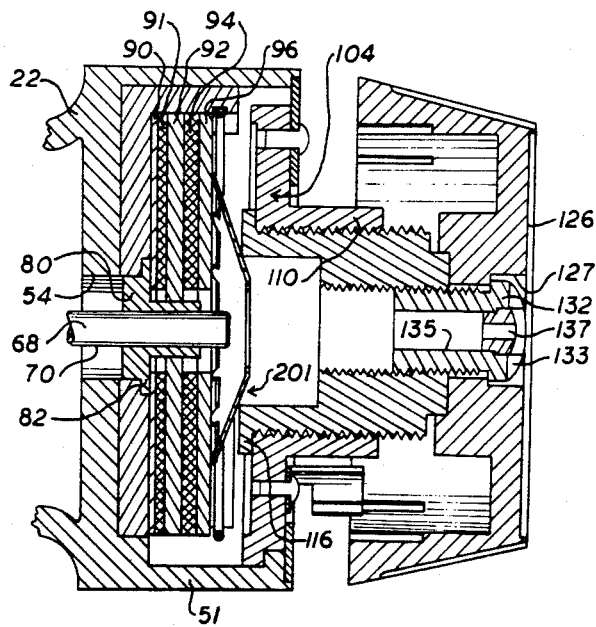
FIG. 5 is a vertical cross sectional view similar to FIGS. 3 and 4 only showing a modified form of spring.
Figure 6:
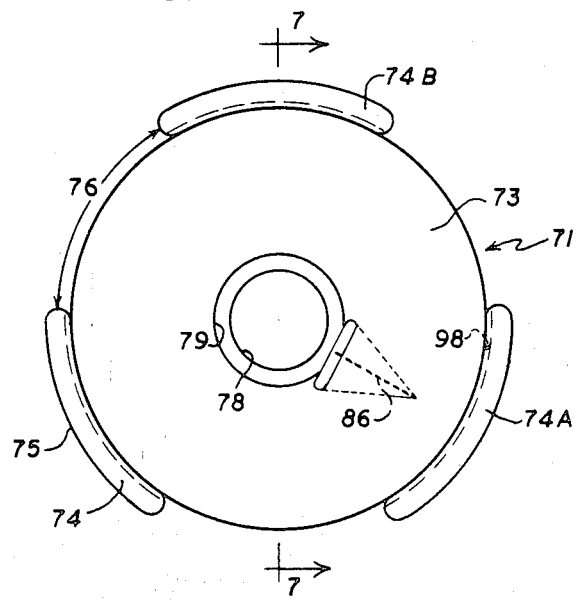
FIG. 6 is a plan view of the cartridge housing.
Figure 7:
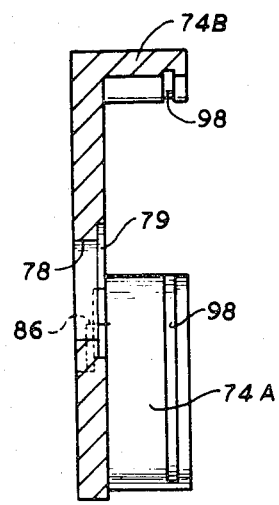
FIG. 7 is a cross sectional view of the cartridge housing of FIG. 6.
Figure 14:
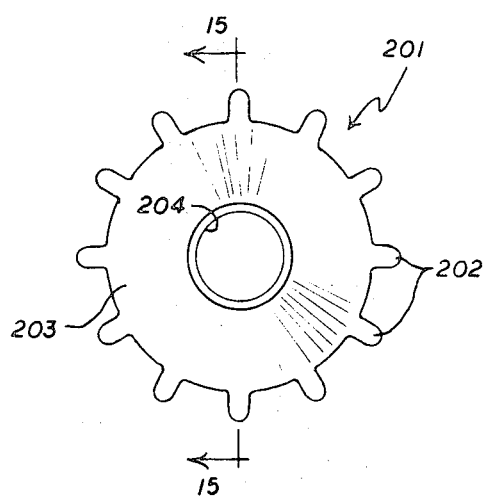
FIG. 14 is a plan view of a modified form of spring.
Figure 15:
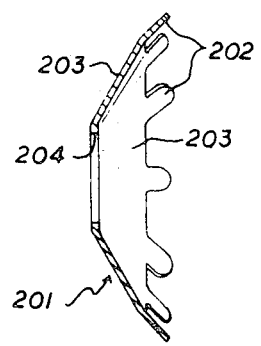
FIG. 15 is a cross sectional view taken along the line 15—15 of FIG. 14.

FIGS. 5, 14 and 15 show a modified form of the invention and in particular a disc shaped spring member 201 having multiple fingers 202 axially and radially extending from a cone-shaped body portion 203. An opening 204 extends through the center portion thereof. As shown in FIG. 5, the spring member 201 is positioned between the stationary washer 95 of the cartridge assembly 72 and the flanged end portion 116 of the axially movable member 115 whereby turning the knob 102 will depress the spring member 201 and apply drag to the centershaft through the cartridge assembly.

It is contemplated that several cartridge assemblies 72 will be provided for use with a particular fishing reel. Each cartridge assembly will have a rating depending upon the material of the friction washers and/or the surface characteristics of the stationary washer 95, driven washer 92, and base washer 90. Several different springs 101 will also be provided which will also be rated. A fisherman can establish the drag setting range for his reel by backing the knob 102 to the off position (with the flange 116 against the cover plate 104) whereupon depressing and turning the knob assembly relative to the reel housing will disengage the locking lugs 107 from the lugs 60, 60a, 60b so that the knob assembly 100 can be removed from the reel. The drag cartridge assembly in the cavity is removed by shaking or cranking the reel by rotating crank assembly 26 with the cavity facing downward. The selected drag cartridge assembly 72 is dropped into the cavity by aligning segments 74, 74a and 74b with slots 62 which also properly aligns cartridge assembly 72 with the abutments 66 so that the cartridge assembly will not turn relative to the reel. In the process of inserting the cartridge, the keyed portion 70 of the centershaft is oriented to align and enter the keyed portion 84 of the drag drive member 80 so that the centershaft is keyed to the driven washer 92 through the key 85 in the drive member 80 and the key 93 in the driven washer 92. The spring 101 in the knob assembly 100 is popped out and the newly selected spring 101 is force fit onto the retainer 122. The knob assembly is then assembled with the reel by aligning the locking lugs 107 with the spacings 62, and depressing and turning the knob assembly until the detents 108 straddle the lugs 60, 60a, 60b. A force resulting from deflection of seal ring 112 now causes seating of the knob assembly on the reel housing and the knob can be turned to adjust the drag. The spool 31 can also be changed to install a line with a test rating commensurate with the drag setting.

The assembly and disassembly of the drag adjusting assembly with the reel is accomplished without tools, and since the cartridge assembly is a single piece, there are no multiplicity of parts to lose.

Each cartridge assembly 72 can be repaired or modified easily. That is, the lock 97 can be contracted to remove it from the grooves 98 whereupon replacement friction washers 91, 94, base washer 90 and stationary washer 95 can be individually or collectively replaced. The replacement can be in kind or can be of different materials and of different surface characteristics as desired.

Lubrication of the drag may be accomplished by application of lubricant through the lubrication fitting 137 which by virtue of preassembly is an integral part of the retaining screw 132.

I claim:

1. In a method of assembling a drag cartridge means in an open faced spinning reel the reel having a housing with a back end portion, an axially reciprocating center shaft extending through the housing and projecting rearward into a rearward facing cavity on the back end portion; a keyed portion on the center shaft extending into the rearward facing cavity;

a spool carried by a forward portion of the centershaft;

a handcrank;

a rotatably mounted bail support member connected by transmission means to the handcrank to be rotated thereby;

bail means pivotally mounted on the support member to be rotated therewith; the improvement comprising the steps of assembling a drag cartridge means on the housing comprising:

(a) selecting a cartridge means having a particular drag range;

(b) aligning means on the cartridge means with mating means in the cavity;

(c) threading the keyed portion of the centershaft into a mating keyed portion of a drag drive means on the cartridge means;

(d) moving the cartridge means into the cavity with the center shaft and drag drive means keyed together and with the mating aligning means engaged to prevent rotation of the cartridge means relative to the reel housing;

(e) selecting a spring of a particular rating to correspond with the drag range of the cartridge means and the test rating of the line on the spool;

(f) assembling the spring with a drag knob assembly;

(g) aligning latching means on the drag knob assembly with coacting means on the reel housing;

(h) depressing the drag knob assembly to depress the spring against the cartridge means; and (i) rotating the drag knob means relative to the housing to latch the latching means on the reel housing whereby the drag on the centershaft can be varied by turning the knob on the drag knob means.

* * * * *